United States Patent [19]
Keip

[11] Patent Number: 6,073,985
[45] Date of Patent: Jun. 13, 2000

[54] STORAGE COMPARTMENT FOR TRUCK BEDS

[76] Inventor: Charles P. Keip, 1052 Byron Rd., Byron Center, Mich. 49315

[21] Appl. No.: 09/277,543

[22] Filed: Mar. 26, 1999

[51] Int. Cl.[7] .................................................. B60P 1/00
[52] U.S. Cl. .......................................... 296/37.6; 296/37.1
[58] Field of Search .................................. 296/37.1, 37.6, 296/50, 51, 52, 55

[56] References Cited

U.S. PATENT DOCUMENTS

| | | |
|---|---|---|
| 4,451,075 | 5/1984 | Canfield . |
| 4,749,226 | 6/1988 | Heft . |
| 4,884,838 | 12/1989 | Slater . |
| 4,938,398 | 7/1990 | Hallaan . |
| 5,299,722 | 4/1994 | Cheney ........................... 296/37.6 X |
| 5,498,049 | 3/1996 | Schlachter . |
| 5,848,744 | 12/1998 | Dischner et al. ............... 296/37.6 X |
| 5,893,599 | 4/1999 | Strohfeldt ........................... 296/37.6 |
| 5,924,615 | 7/1999 | McGarrah ...................... 296/37.6 X |
| 5,964,492 | 10/1999 | Lyon ................................. 296/37.6 |

*Primary Examiner*—D. Glenn Dayoan
*Assistant Examiner*—Lori L. Coletta
*Attorney, Agent, or Firm*—Harpman & Harpman

[57] ABSTRACT

A removable storage device for pick-up truck beds comprising, a pair of upstanding contoured sidewalls and a contoured rear wall with an integral floor extending therebetween. A hinged top and integral front wall defines an access opening. Mounting extensions are secured to the truck bed to provide side mounting fixtures for the storage device of the invention.

5 Claims, 9 Drawing Sheets

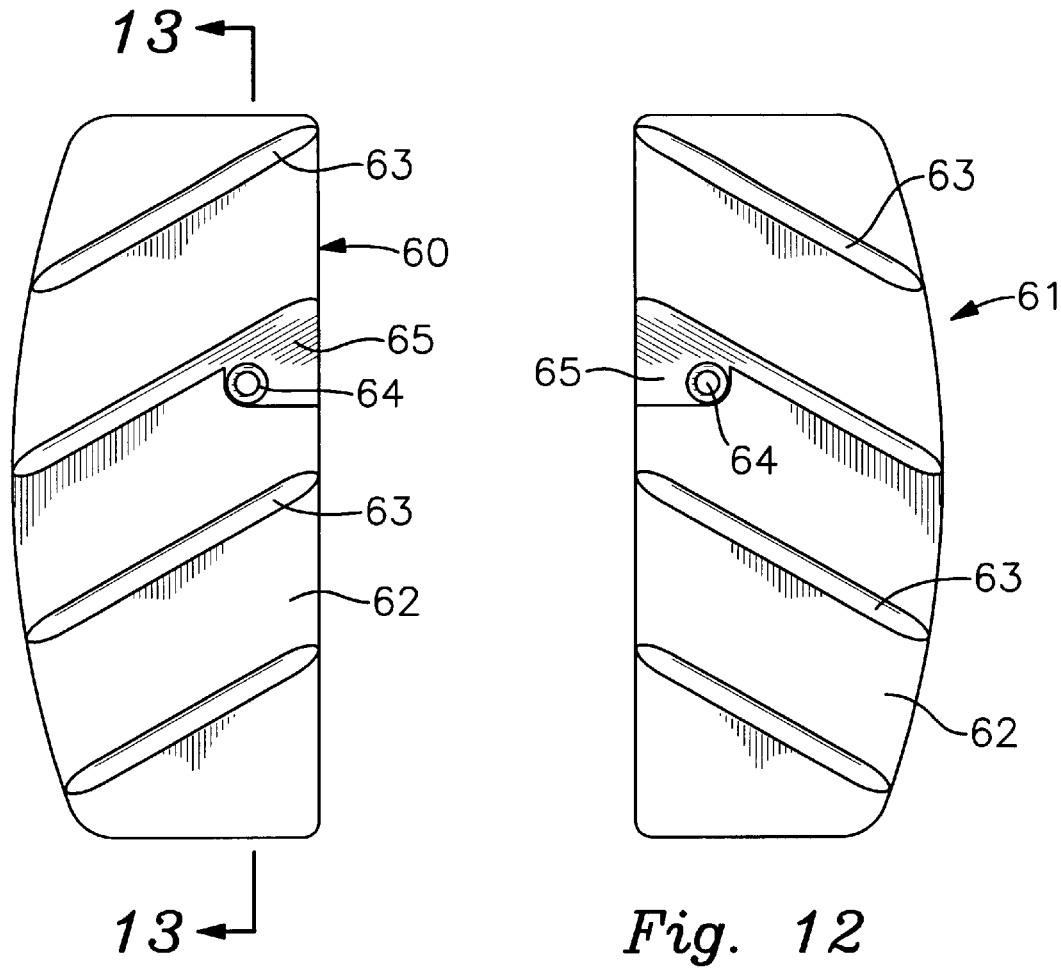
Fig. 11
Fig. 12
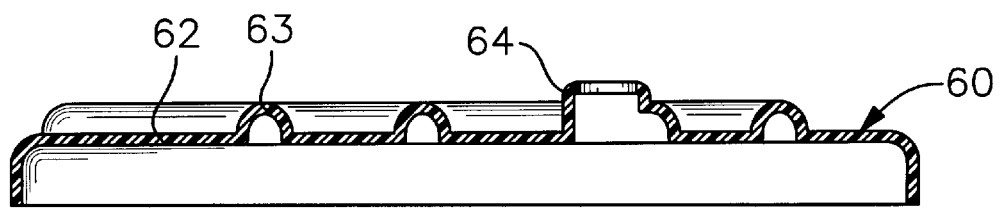
Fig. 13

STORAGE COMPARTMENT FOR TRUCK BEDS

BACKGROUND OF THE INVENTION

1. Technical Field

The present invention relates generally to storage enclosure inserts for pick-up truck beds.

2. Description of Prior Art

Prior art devices of this type have relied on a variety of box-like enclosures that are secured within the bed portion of a pick-up truck for storage typically these devices are weather-proof and lockable so that items can be stored safely while being readily accessible. Some devices utilize portions of the truck bed as structural components while others are completely free standing containers that can be removed intact from the truck bed.

Such prior art devices can be seen for example in U.S. Pat. Nos. 4,451,075, 4,749,226, 4,884,838, 4,938,390 and 5,498,049.

In U.S. Pat. No. 4,451,075 a removable storage cover for truck beds can be seen having a hinged rigid back wall and a hinged rigid top cover. The back wall is contoured to fit between the wheel wells of the truck bed and the top cover is located to a fitting on the truck tailgate.

U.S. Pat. No. 4,749,226 discloses a box-like storage unit having a hinged back, top and front wall and using the truck bed sidewalls and floor for the completion of the storage compartment.

A combined airfoil and loading ramp for pick-up trucks is disclosed in U.S. Pat. No. 4,884,838 having an angularly positioned back wall and a tailgate cap fitting defining an enclosure within.

U.S. Pat. No. 4,938,390 is directed to a truck storage box having upstanding walls, a tapered back wall and an upstanding front wall. A hinge top cover allows for access to the box mounted in a pick-up truck bed adjacent the tailgate.

A hinged security trunk for a vehicle tailgate is set forth in U.S. Pat. No. 5,498,049. The enclosure is adapted to be hinged to a vertical tailgate within the truck bed. The trunk can be accessed by a hinged top when in tailgate open position and through the tailgate when in tailgate closed position.

SUMMARY OF THE INVENTION

A self-contained storage device for use in a bed of a pick-up truck to provide a secure weather-tight enclosure for storage of items within. The storage device of the invention is adjustably secured within the truck bed adjacent the tailgate opening and has a one-piece contoured hinged top and wall portion for access thereto. A pair of contoured mounting inserts are removably secured to the upstanding sidewalls of the storage device of the invention for mounting same within the pick-up truck bed.

DESCRIPTION OF THE DRAWINGS

FIG. 11 is a front elevational view of a left side wall mounting insert for the storage device of the invention;

FIG. 12 is a front elevational view of the right sidewall mounting insert for the storage device of the invention;

FIG. 13 is an enlarged cross-sectional view on lines 13—13 of FIG. 11;

DESCRIPTION OF THE PREFERRED EMBODIMENT

Figure 1:
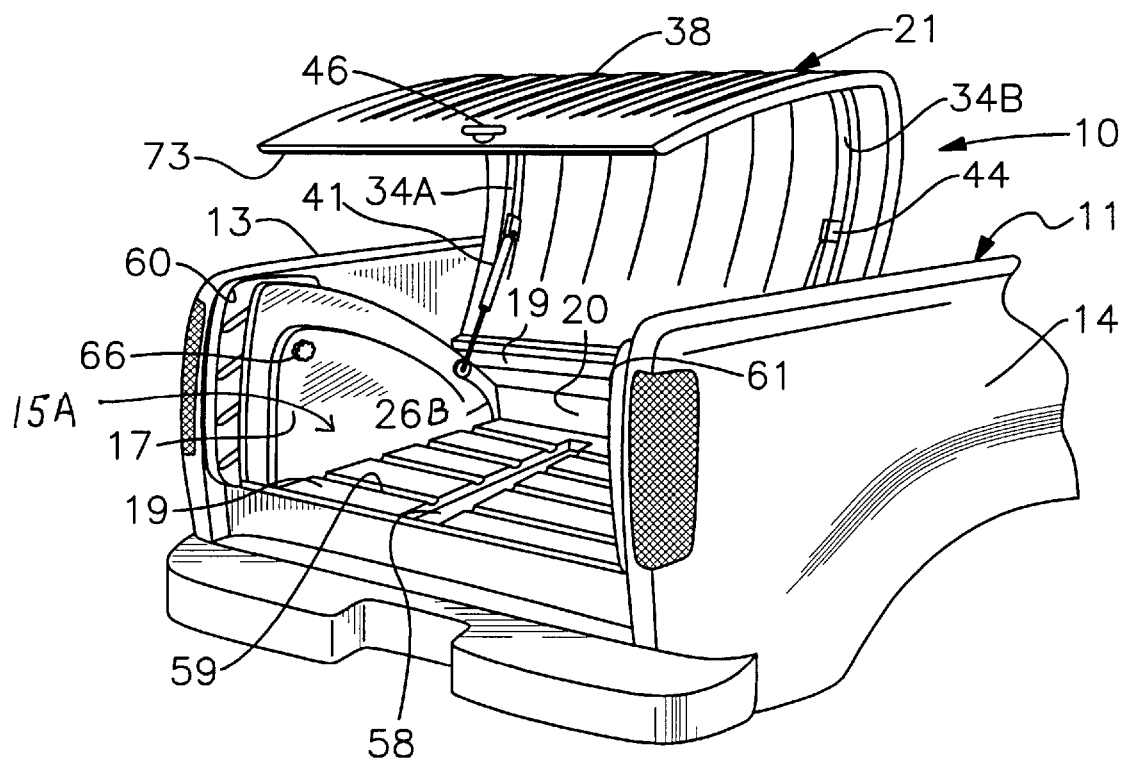
FIG. 1 is a partial perspective view of a pick-up truck bed with the storage container of the invention in open position within.
Figure 2:
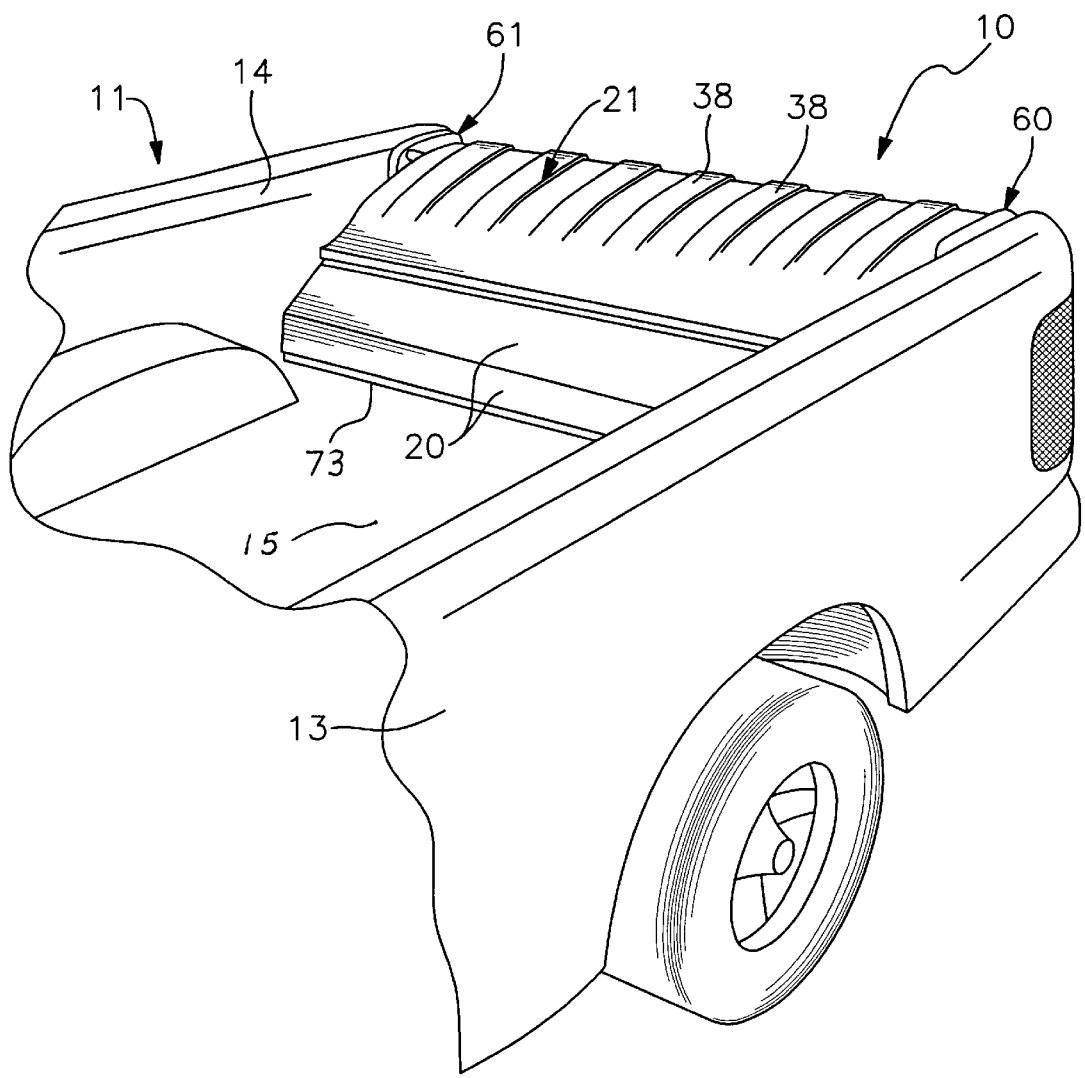
FIG. 2 is a partial perspective view of the storage container of the invention in closed position within the pick-up truck bed portion.

Referring to FIGS. 1 and 2 of the drawings, a pick-up truck can be seen having a bed 11 with a storage device 10 of the invention positioned within. The truck bed 11 has a pair of sidewalls 13 and 14 and internal bottom floor 15 and a tailgate opening 15A as will be well known and understood within the art. The storage device 10 is removably secured with the truck bed 11 adjacent the tailgate opening to provide a self-contained weather-proof secured storage compartment for the user.

Figure 4:
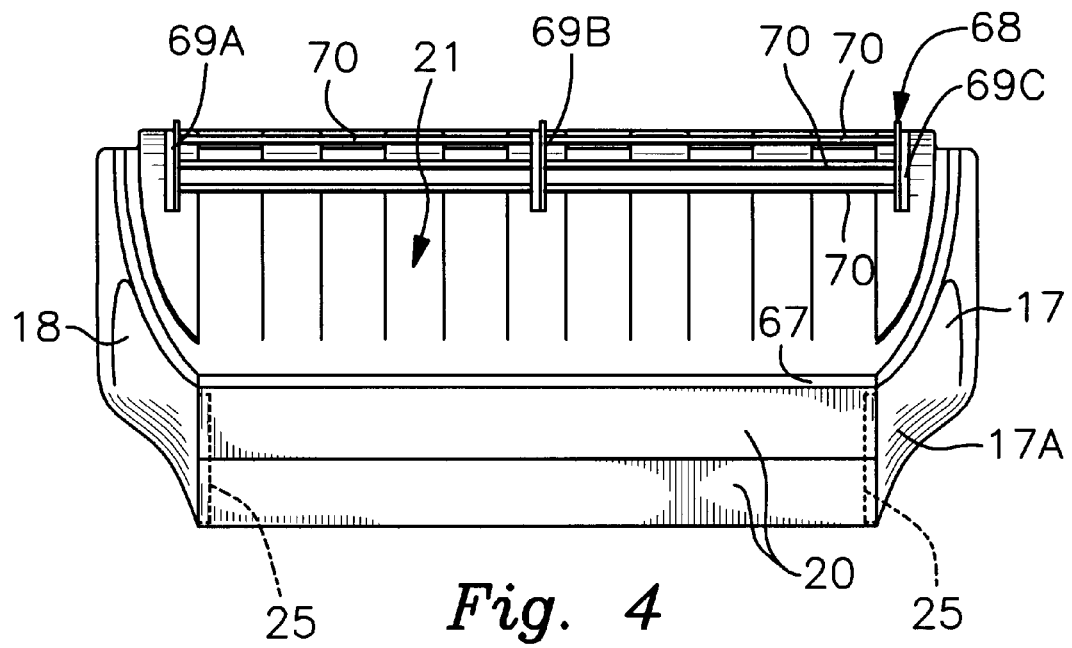
FIG. 4 is a rear elevational view of the storage container of the invention.
Figure 6:
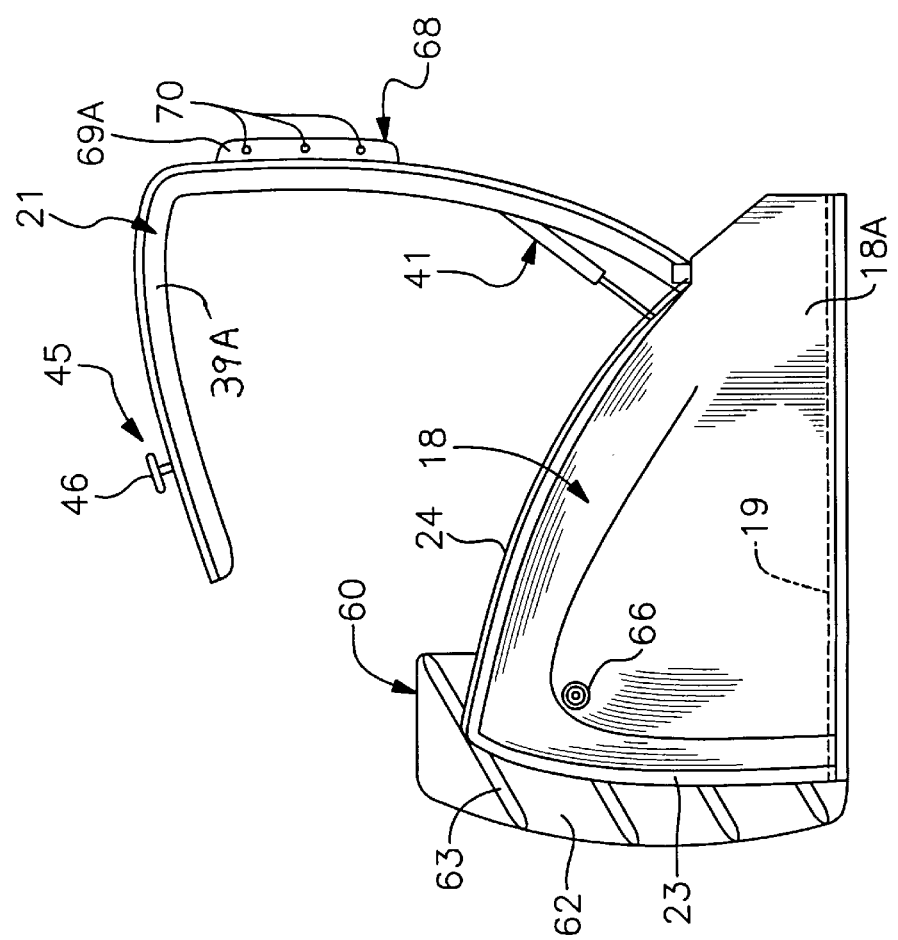
FIG. 6 is a side elevational view of the storage container of the invention in open position with a mounting insert attached thereto.
Figure 8:
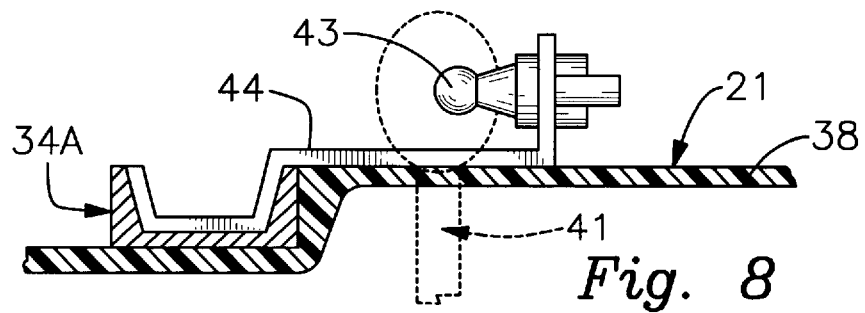
FIG. 8 is an enlarged partial cross-sectional view of a pneumatic cylinder mounting bracket on the hinged top portion of the invention.
Figure 9:
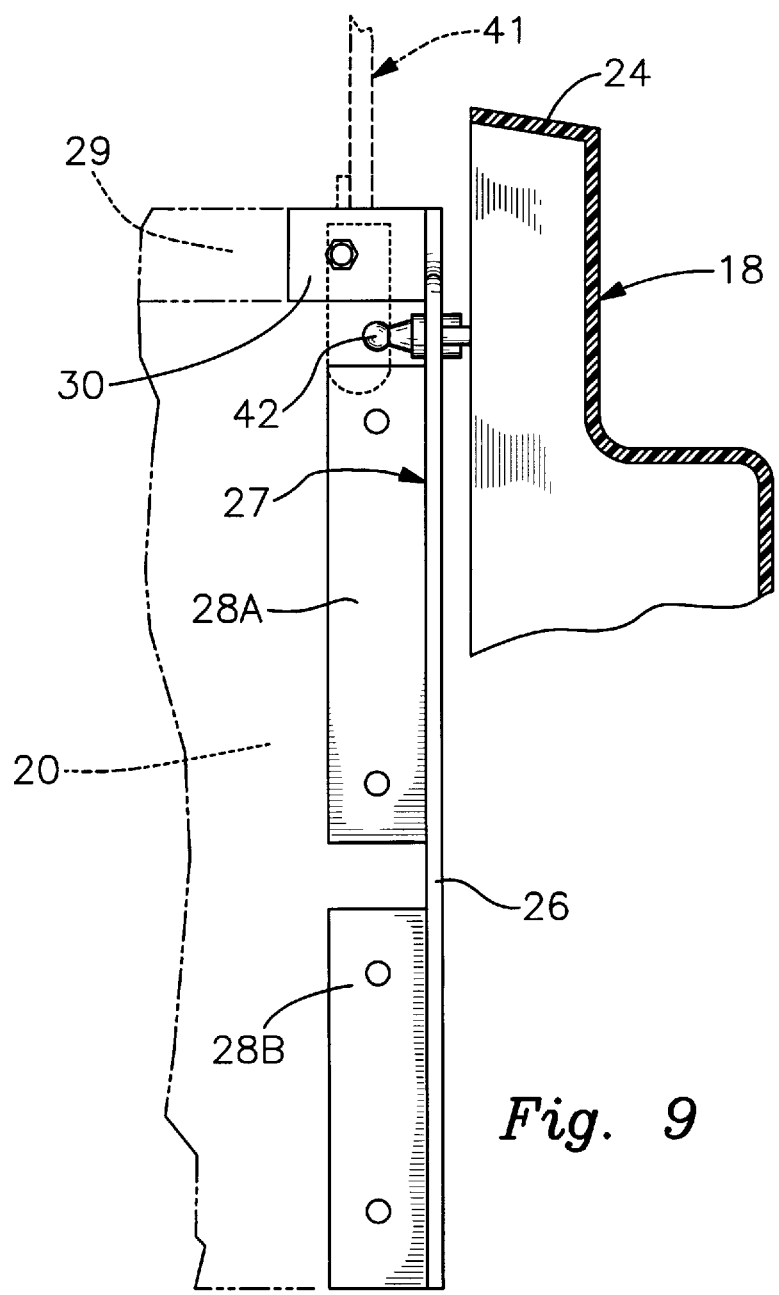
FIG. 9 is an enlarged cross-sectional view of a pneumatic cylinder rod mounting bracket and top support frame of the storage compartment.

The storage device 10 has oppositely disposed contoured sidewalls 17 and 18 with an integral bottom 19 therebetween. An angled rear wall 20 extends from the bottom 19 between the respective sidewalls 17 and 18 defining a storage area within the enclosure. A one-piece access top 21 is hingeably secured to the rear wall 20 by a hinge support assembly 22 for registration over the respective contoured sidewalls 17 and 18 providing for access to and defining the storage area within. Each of the respective sidewalls 17 and 18 are preferably molded from synthetic resin material having a front registration flange 23 with a curved top flange 24 extending integrally therefrom, as best seen in FIG. 6 of the drawings. The sidewalls 17 and 18 are curved inwardly at 17A and 18A having respective mounting flanges at 25 so as to be engaged to the contoured rear wall 20 as best seen in FIGS. 4 and 6 of the drawings.

Figure 7:
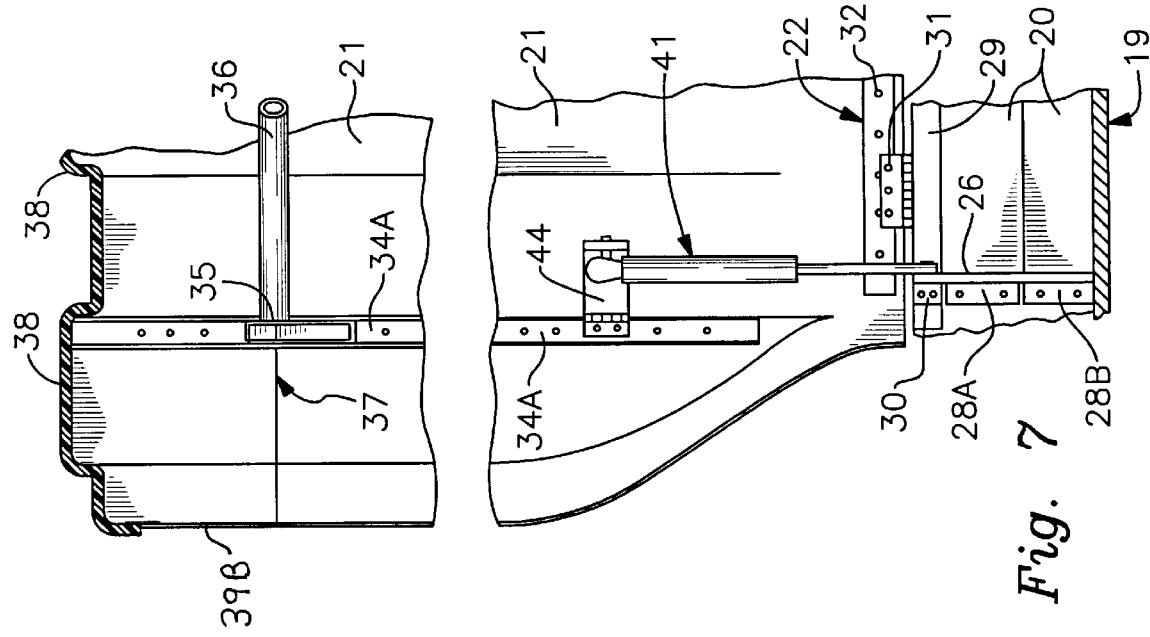
FIG. 7 is a front elevational view of the storage container in open position with portions broken away for illustration purposes.
Figure 10:
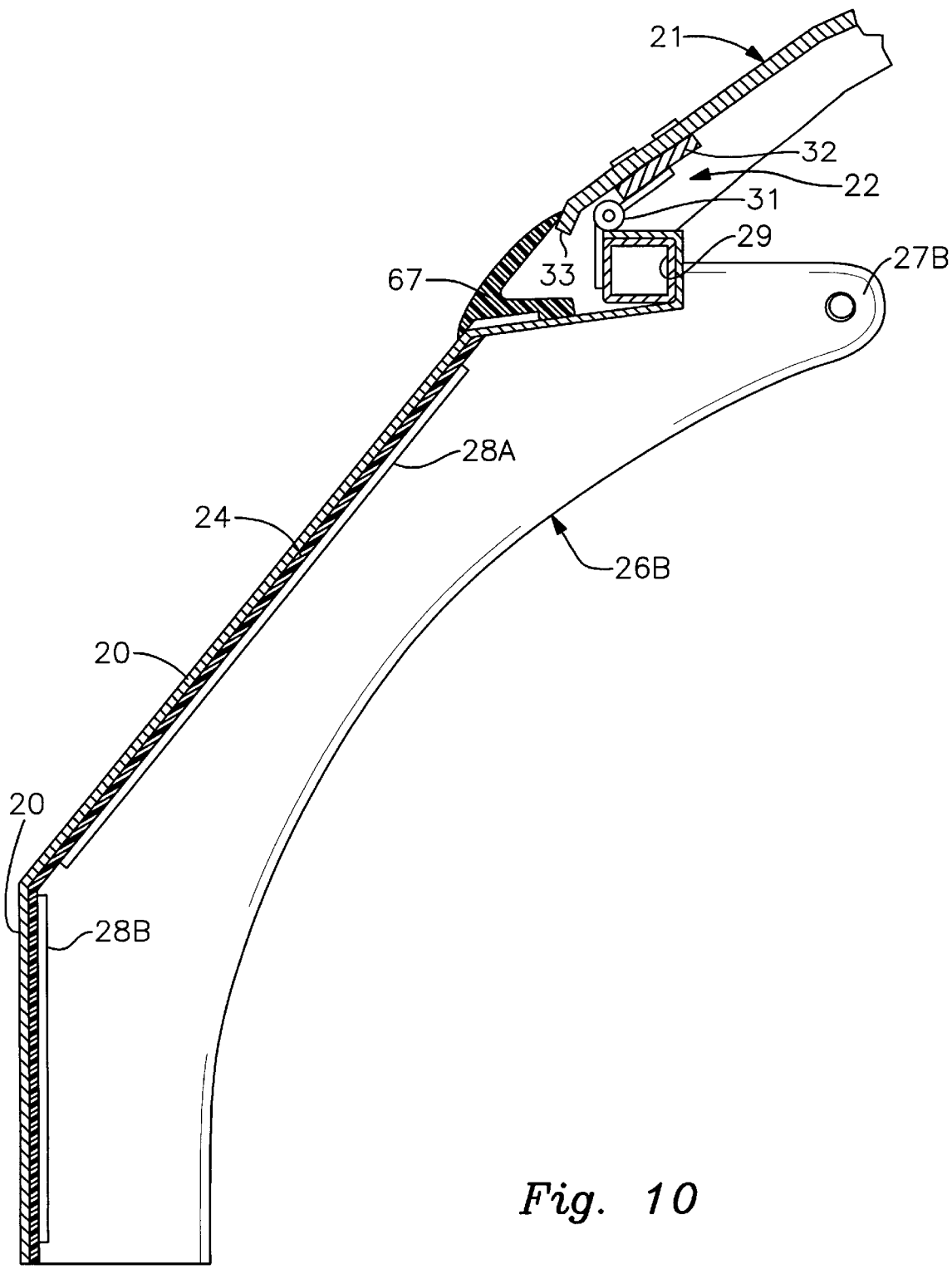
FIG. 10 is an enlarged partial cross-sectional view of a support frame strut and back wall of the storage device.

Referring now to FIGS. 7 and 10 of the drawings, the hinge support assembly 22 can be seen having a pair of oppositely disposed support arms 26A and 26B with apertured ends 27A and 27B and a pair of apertured mounting flanges 28A and 28B. Each of the support arms 26A and 26B are secured to the rear wall 20 and respective sidewalls 17 and 18 by the mounting flanges 28A and 28B.

A tubular support brace 29 extends longitudinally between and is secured to the support arms 26A and 26B by respective offset brackets 30.

A plurality of hinges 31 are secured in longitudinally spaced relation to one another to the tubular support brace 29 and correspondingly to a reinforcing bar 32 that is in turn secured to the top 21 along its adjacent free edge as best seen in FIGS. 7 and 10 of the drawings.

Figure 3:
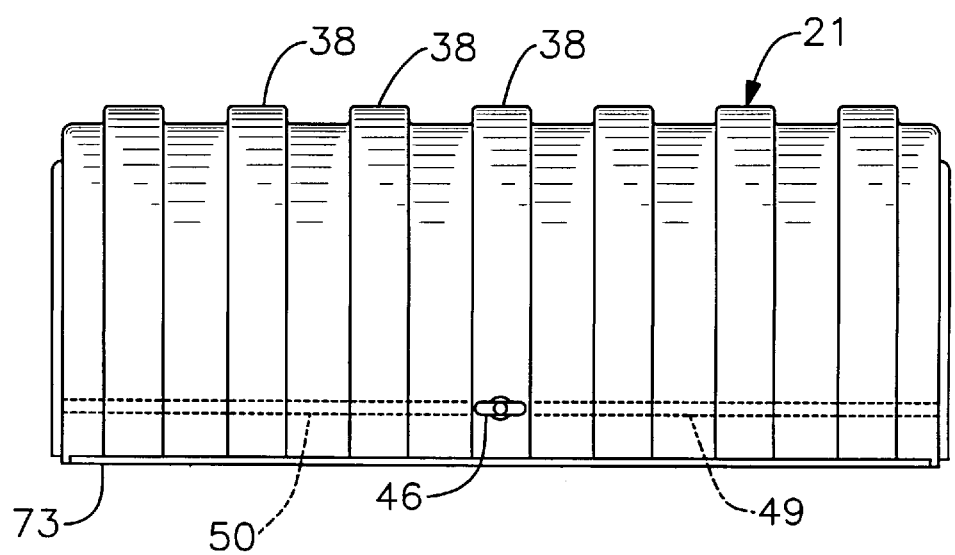
FIG. 3 is a front elevational view of the storage container of the invention.
Figure 14:
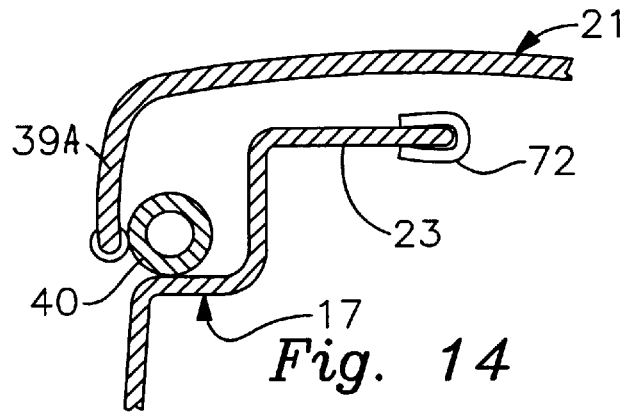
FIG. 14 is an enlarged partial cross-sectional view of a closure gasket and engageable sidewalls of the invention.

The top 21 has a pair of longitudinally spaced reinforcing and mounting channels 34A and 34B secured thereto. Each of the channels are cross-sectionally Unshaped and have transition fittings 35 registerably secured within. A tubular stiffening element 36 extends between and is secured to the respective transition fittings along an angular transition point 37. The top 21 is preferably molded of synthetic resin material with a plurality of contoured ribs 38 molded therein as best seen in FIG. 3 of the drawings. The top 21 has sealing flanges 39A and 39B that extend downwardly along its respective transverse edges so as to overlap the respective front and top flanges 23 and 24 as best seen in FIG. 14 of the drawings. A resilient sealing gasket 40 extends along the edge of the sealing flanges so as to engage the respective sidewalls 17 and 18.

Referring now to FIGS. 6, 7, 8 and 9 of the drawings, a pair of gas springs 41 are mounted between respective ball fittings 42 in the apertured end of the support arms 26 to a secondary ball fittings 43 on offset extending brackets 44 mounted to the reinforcing channels 34A and 34B in spaced relation with the transition fitting 35 hereinbefore described.

The gas springs 41 provide lift assistance to the top 21 and hold same in open position as seen in FIG. 6 of the drawings and are well known and understood within the art so that no further description is necessary.

Referring now to FIGS. 3, 17–19 of the drawings, a top latching assembly 45 can be seen having a handle 46 mounted to the top 21 with an activation shaft 47 extending therefrom. A pair of oppositely disposed latching rods 48 and 49 have flattened apertured ends at 50 that are pivotally secured to a bracket 51 on the end of the activation shaft 47. The rods 48 and 49 are shown in locked closed position in solid lines in FIG. 17 and in open position in broken lines.

Figure 15:
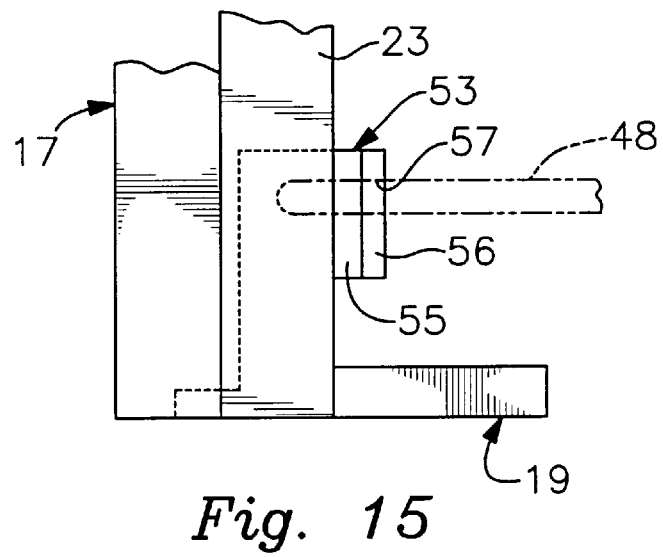
FIG. 15 is an enlarged partial front elevational view of a locking engagement bracket on the sidewall of the invention.
Figure 16:
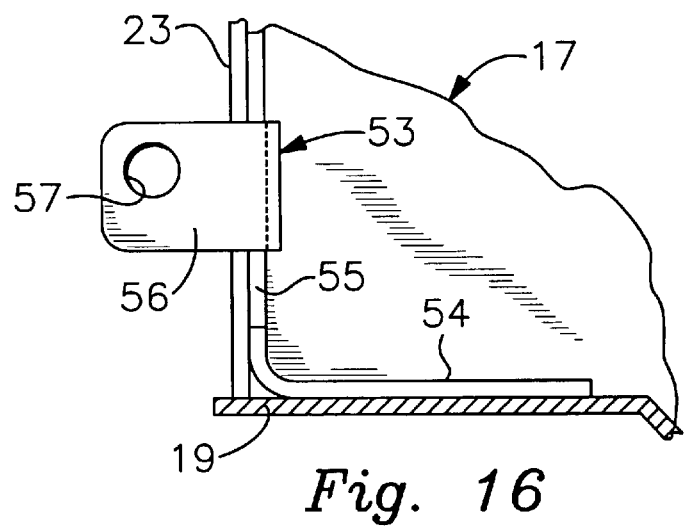
FIG. 16 is an enlarged partial side elevational view of the locking engagement bracket seen in FIG. 15.
Figure 17:
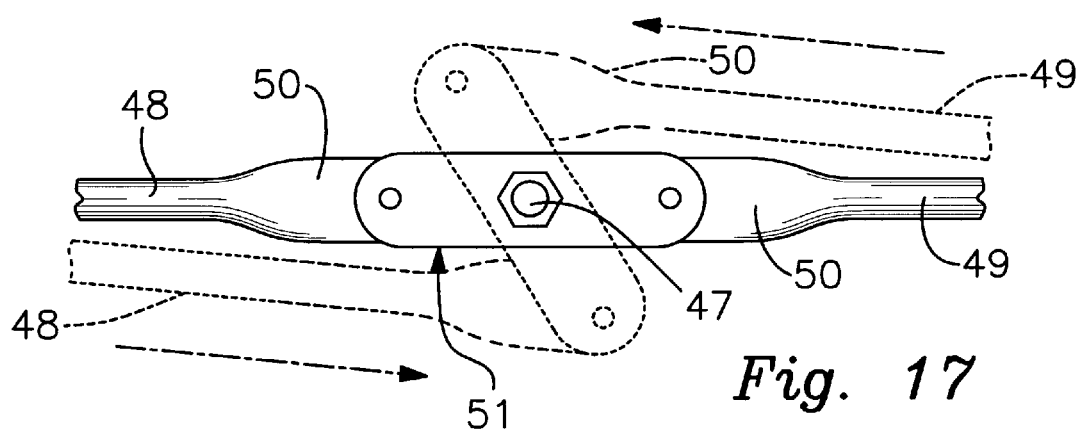
FIG. 17 is an enlarged partial top plan view of the latch and handle assembly.
Figure 18:
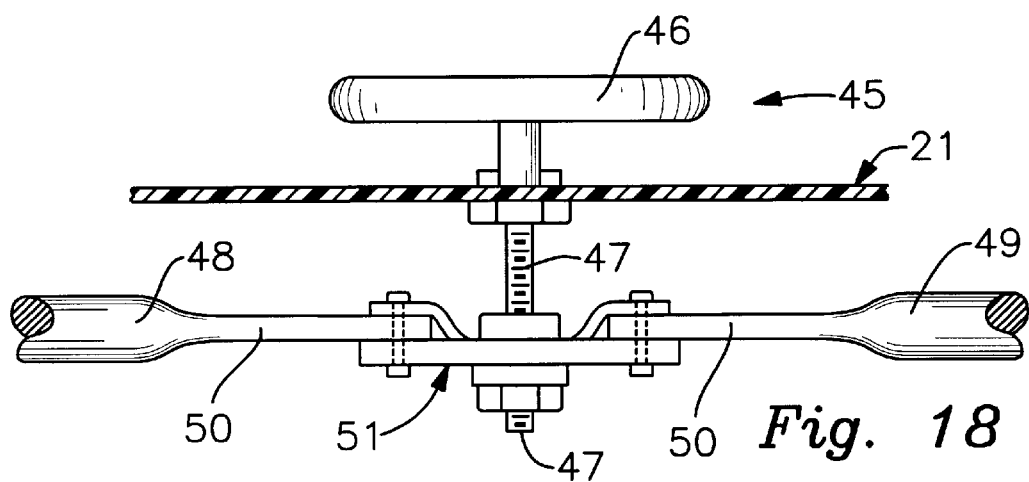
FIG. 18 is an enlarged partial front elevational view of a latch handle assembly and pivotally attached activation rods.
Figure 19:
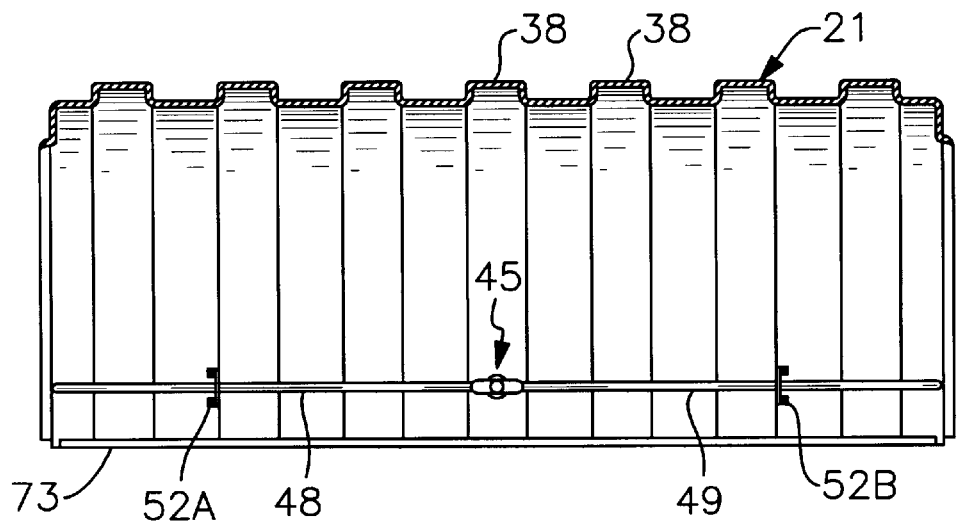
FIG. 19 is a partial cross-sectional view of the latch handle assembly mounted on the top closure element of the invention.

The latching rods 48 and 49 extend through guide brackets 52A and 52B respectively secured to the inner surface of the top 21 and are aligned for registration with rod engagement plates 53 mounted to the respective front flanges 23 of the sidewalls 17 and 18 and overlie a portion of the adjacent bottom 19 as best seen in FIGS. 15 and 16 of the drawings.

Each of the rod engagement plates 53 have a base plate portion 54 with an upstanding flange 55 with a right angularly extending portion 56 with lock bar engagement aperture 57 therein.

It will be apparent to those skilled in the art that once the top 21 has been closed, the activation rods 48 and 49 can be advanced engaging within the apertures 57 in the plates 56 securing the top 21 in closed position as seen in FIGS. 2, 3 and 4 of the drawings.

The bottom 19 of the storage device 10 is also preferably made from synthetic resin material having a plurality of longitudinal and transversely positioned reinforcing ribs 58 and 59 molded within.

The contoured rear wall 20 is preferable formed of sheet metal and is joined to the respective sidewalls 17 and 18 and bottom 19 by the plurality of self-tapping screw fasteners, (not shown) as will be well understood by those skilled in the art.

Referring now to FIGS. 1, 6, 11–13 of the drawings, a pair of right and left mounting inserts 60 and 61 can be seen. Each is molded from synthetic resin material having a top surface 62 with a plurality of upstanding ribs 63 extending angularly across. An apertured mounting lug 64 extends from a raised area 65 to be registerably engaged by a threaded attachment knob 66 extending through the respective sidewalls 17 and 18, best seen in FIGS. 1 and 6 of the drawings.

Referring back to FIG. 10 of the drawings, a weather gasket 67 can be seen secured to the back wall 20 that extends between the top 21 and rear wall 20 overlapping an edge 33 of the top 21 when in closed position.

Figure 5:
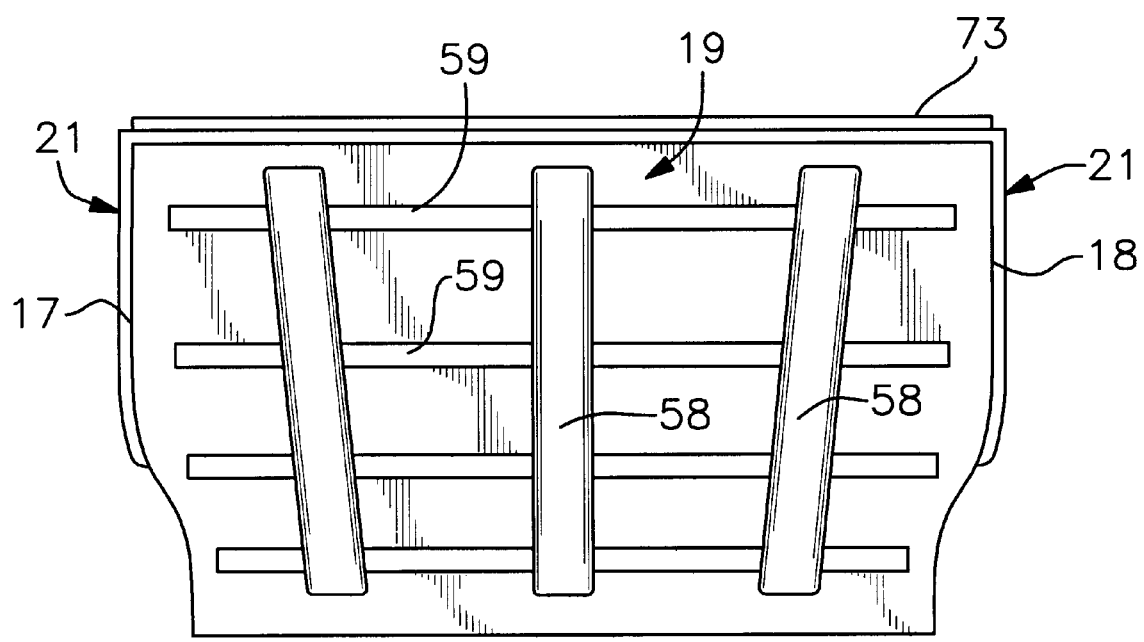
FIG. 5 is a bottom plan view of the storage container of the invention.

Referring now to FIGS. 4, 5 and 6 of the drawings, an auxiliary materials rack 68 is secured to the outer surface of the top 21. The materials rack 68 has three upstanding apertured mounting brackets 69A, 69B and 69C with a plurality of rods 70 extending therethrough. The materials rack 68 provides a resting surface for the transport of long material, not shown, within the truck bed 11.

A gasket 72 is fitted over a perimeter edge of the flanges 23 on the respective contoured sidewalls 17 and 18. A weather gasket 73 extends along the leading edge of the top 21 so as to be registerable on the bottom 19.

It will be evident from the above description that the storage device 10 of the invention can easily be positioned within the bed portion 11 of the pick-up truck by use of the mounting inserts 60 and 61 that are removably secure to the sidewalls 13 and 14. Each of the mounting inserts 60 and 61 provide an air flow dynamic when the vehicle is in motion as well as a visual deterrent of the contents of the truck bed beyond the storage device 12 positioned therein.

It will further be appreciated by those skilled in the art that the storage device 10 of the invention is a self-contained structure that can readily be positioned in and out of the truck bed 11 and that the top 21 provides exceptional access to the storage area defined within the storage device since as hereinbefore described it acts as both the front wall of the device as well as the top due to its inherent aerodynamic contoured shape and overlapping nature of the respective sidewalls 17 and 18.

It will thus be seen that a new and useful storage device for a pick-up truck has been illustrated and described and it will apparent to those skilled in the art that various changes and modifications may be made therein without departing from the spirit of the invention.

Therefore I claim:

1. A truck storage device for mounting in a pick-up truck bed having a pair of spaced parallel vertical bed sidewalls, and a bed bottom interconnecting said bed sidewalls and a tailgate opening between said bed sidewalls, said truck storage device comprising; a pair of vertical sidewalls, a bottom extending between and secured to said sidewalls, an upstanding rear wall interconnecting said sidewalls, a contoured sealing gasket on said rear wall registerable with an integral aerodynamically configured top element, said sidewalls having an integral top and front engagement edges, said top element pivotally secured to said rear wall movable from a closed position overlying said top and front edges of said sidewalls to an open position, a locking assembly for selectively securing said top element in closed position said locking assembly comprising a handle, actuation rods extending from said handle and apertured lap engagement plate on said sidewall for engagement therethrough and means for selectively supporting said top element in open position.

2. The storage device set forth in claim 1 wherein said rear wall has a hinge support assembly comprising, a pair of oppositely disposed support arms, a brace extending between said support arms, a reinforcing bar secured to said top element, a plurality of hinges interconnecting said brace and said reinforcing bar interconnecting said top element with said rear wall.

3. The storage device set forth in claim 1 wherein said means for selectively supporting said top element in open position comprises a pair of gas springs.

4. The storage device set forth in claim 1 further comprises a pair of mounting inserts for adjustably securing said storage device within said truck bed between said bed sidewalls, each of said mounting inserts comprises a generally rectangular configuration, of a plurality of ribs extending from said storage device.

5. The storage device set forth in claim 1 wherein said top element has a plurality of resilient sealing gaskets thereon, said sealing gaskets engageable with of said top and front edges of said vertical sidewalls and said bed bottom.

* * * * *